US012054201B2

(12) United States Patent
Suzuki et al.

(10) Patent No.: US 12,054,201 B2
(45) Date of Patent: Aug. 6, 2024

(54) DRIVING APPARATUS AND ELECTRIC POWER STEERING APPARATUS

(71) Applicant: Mitsubishi Electric Corporation, Tokyo (JP)

(72) Inventors: Junya Suzuki, Tokyo (JP); Akira Kimishima, Tokyo (JP); Takahisa Kawaguchi, Tokyo (JP); Takanori Ichikawa, Tokyo (JP); Kentaro Urimoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 535 days.

(21) Appl. No.: 17/425,784

(22) PCT Filed: Jun. 28, 2019

(86) PCT No.: PCT/JP2019/025774
§ 371 (c)(1),
(2) Date: Jul. 26, 2021

(87) PCT Pub. No.: WO2020/235113
PCT Pub. Date: Nov. 26, 2020

(65) Prior Publication Data
US 2022/0185363 A1 Jun. 16, 2022

(30) Foreign Application Priority Data
May 17, 2019 (JP) .................. 2019-093369

(51) Int. Cl.
*H02M 7/00* (2006.01)
*B62D 5/04* (2006.01)
(Continued)

(52) U.S. Cl.
CPC ......... *B62D 5/0406* (2013.01); *B62D 5/0463* (2013.01); *H02K 5/225* (2013.01);
(Continued)

(58) Field of Classification Search
CPC .................... H02M 7/003; H02M 7/5387
See application file for complete search history.

(56) References Cited

U.S. PATENT DOCUMENTS

| 2011/0285226 A1* | 11/2011 | Fujita | H01L 23/49562 |
| | | | 318/400.27 |
| 2012/0313467 A1* | 12/2012 | Omae | B62D 5/0406 |
| | | | 310/71 |

(Continued)

FOREIGN PATENT DOCUMENTS

| JP | 2016-163416 A | 9/2016 |
| WO | 2019/064423 A1 | 4/2019 |
| WO | 2019/073594 A1 | 4/2019 |

OTHER PUBLICATIONS

Communication dated Dec. 1, 2023 issued by the State Intellectual Property Office of the P.R.China in application No. 201980096395.0.

(Continued)

*Primary Examiner* — Gary A Nash
(74) *Attorney, Agent, or Firm* — Sughrue Mion, PLLC; Richard C. Turner

(57) ABSTRACT

Each of a power-source bus bar and a grounding bus bar provided in a driving apparatus has a terminal portion to be connected with output terminals of a power module and a bending portion bent in a direction perpendicular to a first surface of a bus bar holder; the bending portion is disposed between a smoothing capacitor and the power module; the power-source bus bar and the grounding bus bar are arranged in such a way as to face each other.

20 Claims, 9 Drawing Sheets

(51) Int. Cl.
  *H02K 5/22* (2006.01)
  *H02K 11/33* (2016.01)
  *H02M 7/5387* (2007.01)
(52) U.S. Cl.
  CPC ............ *H02K 11/33* (2016.01); *H02M 7/003* (2013.01); *H02M 7/5387* (2013.01)

(56) References Cited

U.S. PATENT DOCUMENTS

| | | | | |
|---|---|---|---|---|
| 2013/0141871 | A1* | 6/2013 | Omae | H02K 11/33 361/709 |
| 2013/0300264 | A1* | 11/2013 | Fujimoto | B62D 5/0406 310/68 D |
| 2014/0326530 | A1* | 11/2014 | Asao | H02K 11/33 180/443 |
| 2016/0254732 | A1 | 9/2016 | Kojima et al. | |
| 2017/0015347 | A1* | 1/2017 | Asao | B62D 5/0406 |
| 2017/0201204 | A1* | 7/2017 | Kawano | B62D 5/0484 |
| 2017/0237377 | A1* | 8/2017 | Furukawa | H02P 29/028 318/564 |
| 2018/0093698 | A1* | 4/2018 | Urimoto | H02K 15/0062 |
| 2018/0127020 | A1* | 5/2018 | Asao | H02K 11/33 |
| 2021/0362771 | A1 | 11/2021 | Ichikawa et al. | |
| 2021/0371006 | A1 | 12/2021 | Ichikawa et al. | |

OTHER PUBLICATIONS

International Search Report for PCT/JP2019/025774 dated Sep. 24, 2019 [PCT/ISA/210].
Written Opinion for PCT/JP2019/025774 dated Sep. 24, 2019 [PCT/ISA/237].
Extended European Search Report dated Jun. 14, 2022 in European Application No. 19929799.5.
Office Action issued Apr. 25, 2023 in Chinese Application No. 201980096395.0.
Chinese Office Action issued Apr. 11, 2024 in Application No. 201980096395.0.

* cited by examiner

DRIVING APPARATUS AND ELECTRIC POWER STEERING APPARATUS

CROSS REFERENCE TO RELATED APPLICATIONS

This application is a National Stage of International Application No. PCT/JP2019/025774 filed Jun. 28, 2019, claiming priority based on Japanese Patent Application No. 2019-093369 filed May 17, 2019.

TECHNICAL FIELD

The present disclosure relates to a driving apparatus for driving a body to be driven and an electric power steering apparatus.

BACKGROUND ART

To date, there has been a driving apparatus in which a motor unit and a control unit are axially integrated in such a way as to be coupled with each other coaxially with the output axle of a motor. When such an integrated driving apparatus is mounted in a vehicle, for example, as a driving apparatus for an electric power steering apparatus, the axial-direction length thereof has a high tolerance; however, due to restriction on mounting it in the vehicle and the like, the outer diameter thereof is often limited. Thus, when the diameter of the driving apparatus becomes large, it may be difficult to mount it in a vehicle. Therefore, in particular, in the case of an electric power steering apparatus provided with two independent armature windings in a motor and with two independent control systems in a control unit, it is required that in order to contain large components such as a power module and a smoothing capacitor without enlarging the outer diameter of the control unit, the shapes and the arrangement of bus bars for connecting those components are devised.

A conventional driving apparatus disclosed in Patent Document 1 is configured in such a manner that there is adopted a so-called vertical arrangement method for principal constituent members, in which a power module and a control board are arranged in parallel with each other and vertically in the axial direction of a motor, and a bus bar unit holding bus bars for electrically connecting the power module with external connectors is provided in such a way as to be adjacent to a surface of a heat sink. In the conventional driving apparatus configured in such a manner, because the degree of flexibility in designing of layout is raised, the bus bars, terminals, and the like can be more shortened and hence heat generation in each of two or more semiconductor devices can appropriately be suppressed. As a result, it is alleged that the outer diameter of the control unit can be made to fall within a range of restriction on mounting it in a vehicle.

PRIOR ART REFERENCE

Patent Literature

[Patent Document 1] Japanese Patent Application Laid-Open No. 2016-163416

DISCLOSURE OF THE INVENTION

Problems to be Solved by the Invention

The structure of the bus bar is not referred to in Patent Document 1. In the case where in order to downsize the control unit or the driving apparatus, the surface area of the bus bar is decreased, the inductance in a path for supplying electric-power to the motor increases, which becomes a cause of generating noise such as a surge current or a surge voltage in the two or more semiconductor devices in the power module and which may increase heat generation in the two or more semiconductor devices in the power module. In contrast, in the case where the surface area of the bus bar is increased without changing the outer diameter of the control unit, the capacity of the heat sink cannot help being decreased in order to secure a wiring path; thus, the heat-radiation performance of the power module may be deteriorated.

The present disclosure has been implemented in order to solve the foregoing problem; the objective thereof is to provide a driving apparatus that can be downsized and is provided with high heat-radiation performance.

In addition, another objective of the present disclosure is to provide an electric power steering apparatus having a driving apparatus provided with a high heat-radiation performance.

Means for Solving the Problems

A driving apparatus disclosed in the present disclosure includes a motor unit that generates driving force for driving a body to be driven and a control unit that is disposed in such a way that an extending direction of the center axis thereof coincides with an extending direction of the center axis of the motor unit and is fixed to an axis-direction end portion, at the anti-output side, of the motor unit; the driving apparatus is characterized
  in that the control unit includes
    a power module having two or more switching devices that supply a current to the motor unit,
    a smoothing capacitor that smooths the current,
    a calculation circuit that outputs a control signal to the power module,
    a control board on which the calculation circuit is mounted,
    a bus bar unit having terminals for electrically connecting the power module with an external connector, and
    a heat sink for cooling at least the power module,
  in that the bus bar unit includes
    a power-source bus bar to be connected with a positive-polarity side of a power source,
    a grounding bus bar to be connected with a negative-polarity side of the power source,
    an extension terminal to be connected with an output terminal of the power module, and
    a bus bar holder that holds the power-source bus bar and the grounding bus bar,
  in that each of the power-source bus bar and the grounding bus bar has a terminal portion to be connected with the output terminal of the power module and a bending portion bent in a direction perpendicular to a first surface of the bus bar holder,
  in that the bending portion is disposed between the smoothing capacitor and the power module, and
  in that the power-source bus bar and the grounding bus bar are arranged in such a way as to face each other.

A driving apparatus disclosed in the present disclosure includes a motor unit that has a first armature winding and a second armature winding that are independent from each other and generates driving force for driving a body to be driven and a control unit that is disposed in such a way that an extending direction of the center axis thereof coincides with an extending direction of the center axis of the motor unit and is fixed to an axis-direction end portion, at the anti-output side, of the motor unit; the driving apparatus is characterized in that the control unit includes a first control unit that controls a current flowing in the first armature winding and a second control unit that controls a current flowing in the second armature winding, in that the first control unit includes
  a first power module having two or more switching devices that supply a current to the first armature winding,
  a first smoothing capacitor that smooths a current in the first armature winding,
  a first calculation circuit that outputs a control signal to the first power module,
  a first control board on which the first calculation circuit is mounted, and
  a first bus bar unit having terminals for electrically connecting the first power module with an external connector,
in that the first bus bar unit includes
  a first power-source bus bar to be connected with a positive-polarity side of a power source,
  a first grounding bus bar to be connected with a negative-polarity side of the power source,
  a first extension terminal to be connected with an output terminal of the first power module, and
  a first bus bar holder that holds the first power-source bus bar, the first grounding bus bar, and the first extension terminal,
in that each of the first power-source bus bar and the first grounding bus bar has a first terminal portion to be connected with the output terminal of the first power module and a bending portion bent in a direction perpendicular to a first surface of the first bus bar holder,
in that the bending portion is disposed between the first smoothing capacitor and the first power module,
in that the first power-source bus bar and the first grounding bus bar are arranged in such a way as to face each other,
in that the second control unit includes
  a second power module having two or more switching devices that supply a current to the second armature winding,
  a second smoothing capacitor that smooths a current in the second armature winding,
  a second calculation circuit that outputs a control signal to the second power module,
  a second control board on which the second calculation circuit is mounted, and
  a second bus bar unit having terminals for electrically connecting the second power module with an external connector,
in that the second bus bar unit includes
  a second power-source bus bar to be connected with a positive-polarity side of a power source,
  a second grounding bus bar to be connected with a negative-polarity side of the power source,
  a second extension terminal to be connected with an output terminal of the second power module, and
  a second bus bar holder that holds the second power-source bus bar, the second grounding bus bar, and the second extension terminal,
in that each of the second power-source bus bar and the second grounding bus bar has a second terminal portion to be connected with the output terminal of the second power module and a bending portion bent in a direction perpendicular to a first surface of the second bus bar holder,
  in that the bending portion is disposed between the second smoothing capacitor and the second power module,
  in that the second power-source bus bar and the second grounding bus bar are arranged in such a way as to face each other, and
  in that a heat sink for cooling at least the first power module and the second power module is provided.

Furthermore, an electric power steering apparatus disclosed in the present disclosure includes any one of the foregoing driving apparatuses; the electric power steering apparatus is characterized in that assist torque corresponding to steering torque exerted on a steering shaft by a vehicle driver is generated by the driving apparatus and in that the generated assist torque is exerted on the steering shaft.

Advantage of the Invention

The present disclosure makes it possible to obtain a driving apparatus that can be downsized and is provided with a high heat-radiation performance.

The present disclosure makes it possible to obtain an electric power steering apparatus having a driving apparatus that can be downsized and is provided with a high heat-radiation performance.

BEST MODE FOR CARRYING OUT THE INVENTION

Figure 1:
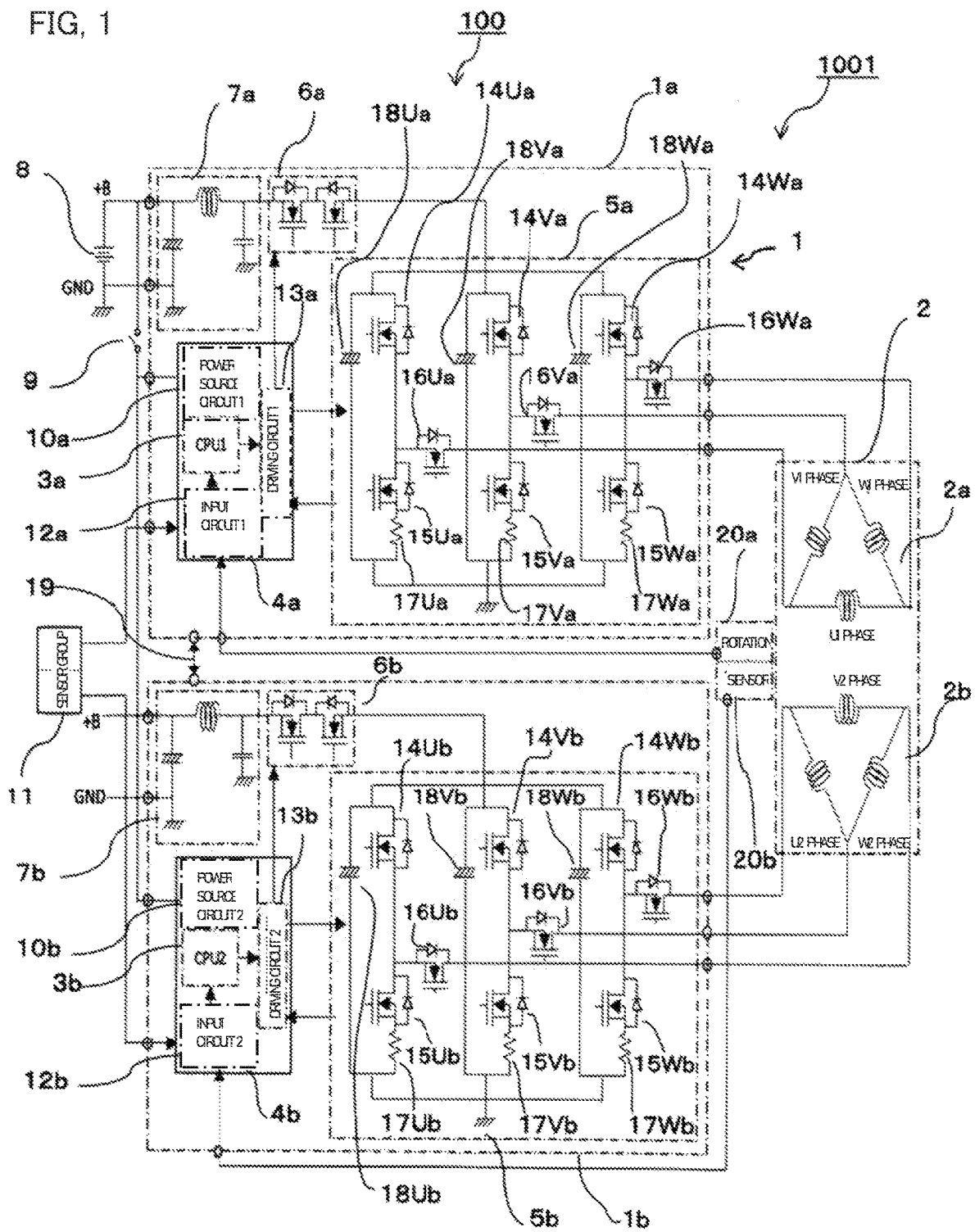
FIG. 1 is an overall circuit diagram of a driving apparatus and an electric power steering apparatus according to Embodiment 1.

Hereinafter, a driving apparatus and an electric power steering apparatus according to each of Embodiments 1 and 2 of the present disclosure will be explained with reference to the drawings. In the respective drawings, the same and similar constituent members have the same reference characters.

Embodiment 1

FIG. 1 is an overall circuit diagram of a driving apparatus and an electric power steering apparatus according to Embodiment 1. In FIG. 1, a driving apparatus 1001 according to Embodiment 1 is provided in an electric power steering apparatus 100 and is configured in such a way as to drive a steering shaft (unillustrated) as a body to be driven. The electric power steering apparatus 100 has the driving apparatus 1001 and a sensor group 11 including a torque sensor for detecting steering torque exerted on a steering shaft by a driver and the like. The electric power steering apparatus 100 is configured in such a way that the torque sensor in the sensor group 11 detects steering torque exerted on the steering shaft by the driver, assist torque corresponding to the detected steering torque is generated by the driving apparatus 1001, and the generated assist torque is exerted on the steering shaft so as to assist steering by the driver.

The driving apparatus 1001 is provided with a control unit 1, a motor unit 2 that generates assist torque as driving force to be exerted on the steering shaft as a body to be driven, a first rotation sensor 20a, and a second rotation sensor 20b. The motor unit 2 has a first armature winding 2a and a second armature winding 2b that are independent from each other. The control unit 1 includes a first control unit 1a for controlling a current in the first armature winding 2a and a second control unit 1b for controlling a current in the second armature winding 2b. The circle mark (o) indicates a connection terminal provided in each of the first control unit 1a and the second control unit 1b.

The first control unit 1a is provided with a first control board 4a as a first control circuit, a first power module 5a included in a first inverter circuit that supplies a current to the first armature winding 2a of the motor unit 2, a first power-source-relay switching device 6a, and a first filter 7a.

The first power module 5a is provided with a three-phase bridge circuit including a U-phase upper-arm switching device 14Ua and a U-phase lower-arm switching device 15Ua that are connected in series with each other, a V-phase upper-arm switching device 14Va and a V-phase lower-arm switching device 15Va that are connected in series with each other, and a W-phase upper-arm switching device 14Wa and a W-phase lower-arm switching device 15Wa that are connected in series with each other.

In addition, the first power module 5a is provided with a U-phase motor-relay switching device 16Ua, a V-phase motor-relay switching device 16Va, a W-phase motor-relay switching device 16Wa, a U-phase shunt resistor 17Ua, a V-phase shunt resistor 17Va, a W-phase shunt resistor 17Wa, a U-phase smoothing capacitor 18Ua, a V-phase smoothing capacitor 18Va, and a W-phase smoothing capacitor 18Wa. The first power module 5a may be formed in such a way that the whole thereof is molded with a resin or that it is divided into several pieces and each piece is molded with a resin.

In the case where a short-circuit failure, a disconnection failure, or the like occurs in any one of the U-phase winding U1, the V-phase winding V1, the W-phase winding W1 of the first armature winding 2a or in the case where any failure occurs in the first power module 5a, at least one of the U-phase motor-relay switching device 16Ua, the V-phase motor-relay switching device 16Va, and the W-phase motor-relay switching device 16Wa is turned off based on a command from an after-mentioned first CPU 3a, so that the connection between the first power module 5a and the first armature winding 2a is disconnected.

A first control circuit 4a as the first control board is provided with the first CPU (Central Processing Unit) 3a, as a first calculation circuit, a first input circuit 12a that converts analogue signals, inputted from the first rotation sensor 20a and the sensor group 11, into digital signals and inputs the digital signals to the first CPU 3a, a first power-source circuit 10a that generates a power-source voltage in the first control board 4a, based on a battery voltage inputted from an external battery 8, and a first driving circuit 13a.

Based on a command from the first CPU 3a, the first driving circuit 13a generates a driving signal and then provides the generated driving signal to the U-phase upper-arm switching device 14Ua, the U-phase lower-arm switching device 15Ua, the V-phase upper-arm switching device 14Va, the V-phase lower-arm switching device 15Va, the W-phase lower-arm switching device 14Wa, and the W-phase upper-arm switching device 15Wa, so that these switching devices are opening/closing-controlled; for example, the first power module 5a is PWM (Pulse Width Modulation)-controlled so that a current to be supplied to the first armature winding 2a of the motor unit 2 is controlled.

The first filter 7a absorbs noise that occurs when each of the switching devices in the first power module 5a is switched. When the first power module 5a fails, when the first armature winding 2a of the motor unit 2 fails, or when the battery 8 fails, the first power-source-relay switching device 6a is turned off based on a command from the first CPU 3a so as to cut off the connection between the battery 8 and the first power module 5a.

The second control unit 1b is provided with a second control board 4b as a second control board, a second power module 5b included in a second inverter circuit that supplies a current to the second armature winding 2b of the motor unit 2, a second power-source-relay switching device 6b, and a second filter 7b.

The second power module 5b is provided with a three-phase bridge circuit including a U-phase upper-arm switching device 14Ub and a U-phase lower-arm switching device 15Ub that are connected in series with each other, a V-phase upper-arm switching device 14Vb and a V-phase lower-arm switching device 15Vb that are connected in series with each other, and a W-phase upper-arm switching device 14Wb and a W-phase lower-arm switching device 15Wb that are connected in series with each other.

In addition, the second power module 5b is provided with a U-phase motor-relay switching device 16Ub, a V-phase motor-relay switching device 16Vb, a W-phase motor-relay switching device 16Wb, a U-phase shunt resistor 17Ub, a V-phase shunt resistor 17Vb, a W-phase shunt resistor 17Wb, a U-phase smoothing capacitor 18Ub, a V-phase smoothing capacitor 18Vb, and a W-phase smoothing capacitor 18Wb. The second power module 5b may be formed in such a way that the whole thereof is molded with a resin or that it is divided into several pieces and each piece is molded with a resin.

In the case where a short-circuit failure, a disconnection failure, or the like occurs in any one of the U-phase winding U2, the V-phase winding V2, the W-phase winding W2 of the second armature winding 2b or in the case where any failure occurs in the second power module 5b, at least one of the U-phase motor-relay switching device 16Ub, the V-phase motor-relay switching device 16Vb, and the W-phase motor-relay switching device 16Wb is turned off based on a command from an after-mentioned second CPU 3b, so that the connection between the second power module 5b and the second armature winding 2b is disconnected.

A second control board 4b as the second control board is provided with the second CPU 3b, as a second calculation circuit, a second input circuit 12b that converts analogue signals, inputted from the second rotation sensor 20b and the sensor group 11, into digital signals and inputs the digital signals to the second CPU 3b, a second power-source circuit 10b that generates a power-source voltage in the second control board 4b, based on a battery voltage inputted from the external battery 8, and a second driving circuit 13b.

Based on a command from the second CPU 3b, the second driving circuit 13b generates a driving signal and then provides the generated driving signal to the U-phase upper-arm switching device 14Ub, the U-phase lower-arm switching device 15Ub, the V-phase upper-arm switching device 14Vb, the V-phase lower-arm switching device 15Vb, the W-phase lower-arm switching device 14Wb, and the W-phase upper-arm switching device 15Wb, so that these switching devices are opening/closing-controlled; for example, the second power module 5b is PWM-controlled so that a current to be supplied to the second armature winding 2b of the motor unit 2 is controlled.

The second filter 7b absorbs noise that occurs when each of the switching devices in the second power module 5b is switched. When the second power module 5b fails, when the second armature winding 2b of the motor unit 2 fails, or when the battery 8 fails, the second power-source-relay switching device 6b is turned off based on a command from the second CPU 3b so as to cut off the connection between the battery 8 and the second power module 5b.

The electric power steering apparatus 100 provided with the driving apparatus 1001 according to Embodiment 1, which is configured in such a manner as described above, is connected between a power source +B supplied by the battery 8 and a grounding portion of the vehicle whose potential corresponds to the ground potential. When the ignition switch 9 is closed, the power source is applied to the first control unit 1a by way of the first power-source circuit 10a of the first control board 4a; concurrently, the power source is applied to the second control unit 1b by way of the second power-source board 10b of the second control circuit 4b.

Moreover, for example, information items from the torque sensor that is mounted in the vicinity of the steering wheel and detects steering torque, a speed sensor that detects a traveling speed of the vehicle, and the like are inputted from the sensor group 11 to the first input circuit 12a of the first control unit 1a and to the second input circuit 12b of the second control unit 1b.

The information items from the sensor group 11 are transferred to the first CPU 3a by way of the first input circuit 12a of the first control board 4a. Based on those information items, the first CPU 3a calculates and outputs a current value, which is a control amount for making the motor unit 2 rotate. The output signal from the first CPU 3a is transferred to the first power module 5a as the first inverter circuit, by way of the first driving circuit 13a included in an output circuit. That is to say, the first driving circuit 13a as the output circuit receives a command signal from the first CPU 3a and then outputs a driving signal for driving the switching devices in the first power module 5a to the switching devices. The first power module 5a has one and the same circuit configuration for each of the U-phase winding U1, the V-phase winding V1, and the W-phase winding W1 in the first armature winding 2a of the motor unit 2 and can supply currents separately to the windings of the respective phases.

The first driving circuit 13a is mounted on the first control board 4a because only a small signal flows therein; however, it can be disposed in the first power module 5a as the first inverter circuit.

The respective electric potential differences across the U-phase shunt resistor 17Ua, across the V-phase shunt resistor 17Va, and across the W-phase shunt resistor 17Wa, the respective voltages of the motor winding terminals, for example, and the like are transferred to the first input circuit 12a; then, these information items are also inputted to the first CPU 3a. The first CPU 3a calculates the difference between a detection value and a current value calculated based on these inputted information items and performs so-called feedback control, so that a desired motor current is supplied to the first armature winding 2a so as to assist steering power. Furthermore, the first CPU 3a also outputs a driving signal for the first power-source-relay switching device 6a that operates as a relay for making or breaking connection between the power source +B supplied by the battery 8 and the first power module 5a; thus, the first power-source-relay switching device 6a can cut off current supply to the motor itself.

Moreover, as described above, the U-phase motor-relay switching device 16Ua, the V-phase motor-relay switching device 16Va, and the W-phase motor-relay switching device 16Wa are provided in the first power module 5a; these motor-relay switching devices can cut off the respective phases.

Because a large current flows therein and hence heat is generated, it may be allowed that the first power-source-relay switching device 6a is contained in the first power module 5a so that a power module, as a whole, is configured. Noise that is emitted due to PWM control of the first power module 5a can be suppressed by the first filter 7a including a capacitor and a coil that are arranged in the vicinity of the power source +B supplied by the battery 8 and the grounding terminal.

The first CPU 3a has an abnormality detection function for detecting an abnormality in any of the sensor group 11, the first driving circuit 13a, the first power module 5a, the first armature winding 2a, and the like, based on the inputted information items; when detecting an abnormality in any thereof, in accordance with the abnormality, for example, in order to cut off current supply only for a predetermined phase, the first CPU 3a turns off the upper-arm switching device, the lower-arm switching device, and the motor-relay switching device for the foregoing phase. Alternatively, it is also made possible that in order to cut off the power source itself, the first power-source-relay switching device 6a is turned off.

The information items from the sensor group 11 are transferred to the second CPU 3b by way of the second input circuit 12b of the second control circuit unit 4b. Based on those information items, the second CPU 3b calculates and outputs a current value, which is a control amount for making the motor unit 2 rotate. The output signal is transferred to the second power module 5b as the second inverter circuit, by way of the second driving circuit 13b included in an output circuit. That is to say, the second driving circuit 13b as the output circuit receives a command signal from the second CPU 3b and then outputs a driving signal for driving the switching devices in the second power module 5b to the switching devices. The second power module 5b has one and the same circuit configuration for each of the U-phase winding U1, the V-phase winding V1, and the W-phase winding W1 of the motor unit 2 and can supply currents separately to the windings of the respective phases.

The second driving circuit 13*b* is mounted on the second control circuit unit 4*b* because only a small signal flows therein; however, it can be disposed in the second power module 5*b* as the second inverter circuit.

The respective electric potential differences across the U-phase shunt resistor 17U*b*, across the V-phase shunt resistor 17V*b*, and across the W-phase shunt resistor 17W*b*, the respective voltages of the motor winding terminals, for example, and the like are transferred to the second input circuit 12*b*; then, these information items are also inputted to the second CPU 3*b*. The second CPU 3*b* calculates the difference between a detection value and a current value calculated based on these inputted information items and performs so-called feedback control, so that a desired motor current is supplied to the second armature winding 2*b* so as to assist steering power. Furthermore, the second CPU 3*b* also outputs a driving signal for the second power-source-relay switching device 6*b* that operates as a relay for making or breaking connection between the power source +B supplied by the battery 8 and the second power module 5*b*; thus, the second power-source-relay switching device 6*b* can cut off current supply to the motor itself.

Moreover, as described above, the U-phase motor-relay switching device 16U*b*, the V-phase motor-relay switching device 16V*b*, and the W-phase motor-relay switching device 16W*b* are arranged in the second power module 5*b*; these motor-relay switching devices can cut off the respective phases.

Because a large current flows therein and hence heat is generated, it may be allowed that the second power-source-relay switching device 6*b* is contained in the second power module 5*b* so that a power module, as a whole, is configured. Noise that is emitted due to PWM control of the second power module 5*b* can be suppressed by the second filter 7*b* including a capacitor and a coil that are arranged in the vicinity of the power source +B supplied by the battery 8 and the grounding terminal.

The second CPU 3*b* has an abnormality detection function for detecting an abnormality in any of the sensor group 11, the second driving circuit 13*b*, the second power module 5*b*, the second armature winding 2*b*, and the like, based on the inputted information items; when detecting an abnormality in any thereof, in accordance with the abnormality, for example, in order to cut off current supply only for a predetermined phase, the second CPU 3*b* turns off the upper-arm switching device, the lower-arm switching device, and the motor-relay switching device for the foregoing phase. Alternatively, it is also made possible that in order to cut off the power source itself, the second power-source-relay switching device 6*b* is turned off.

The first CPU 3*a* and the second CPU 3*b* are connected with each other through a communication line 19 so as to be able to interchange information; when detecting an abnormality, any one thereof transmits information including also the contents of the abnormality to the other one thereof.

The motor unit 2 is a brushless motor in which each of two independent three-phase windings, i.e., each of the first armature winding 2*a* and the second armature winding 2*b* is delta-connected. Because the motor unit 2 is such a brushless motor, the first rotation sensor 20*a* and the second rotation sensor 20*b* for detecting the rotation position of the rotor are mounted in the driving apparatus 1001. In order to secure the redundant system, as described above, each of the first rotation sensor 20*a* and the second rotation sensor 20*b* is mounted; rotation information from the first rotation sensor 20*a* is transferred to the first input circuit 12*a* in the first control board 4*a*; rotation information from the second rotation sensor 20*b* is transferred to the second input circuit 12*b* in the second control board 4*b*.

It may be allowed that the motor unit 2 is not three-phase delta-connected brushless motor but either a three-phase star-connected brushless motor or a motor having dipole-two-pair brushes. Moreover, as is the case with the winding specification of a conventional apparatus, either distributed winding or concentrated winding can be adopted. Furthermore, the motor unit 2 may be a so-called tandem motor having two stators. In this regard, however, either a single armature winding or two armature windings collaborating with each other may be adopted, as long as a desired motor rotation speed and torque can be outputted.

As described above, the driving apparatus and the electric power steering apparatus according to Embodiment 1 are configured in such a way as to have two control systems in which for example, the circuit networks are independent from each other, the connectors are independent from each other, and the sensors are independent from each other so that the redundancy is secured.

Figure 2:
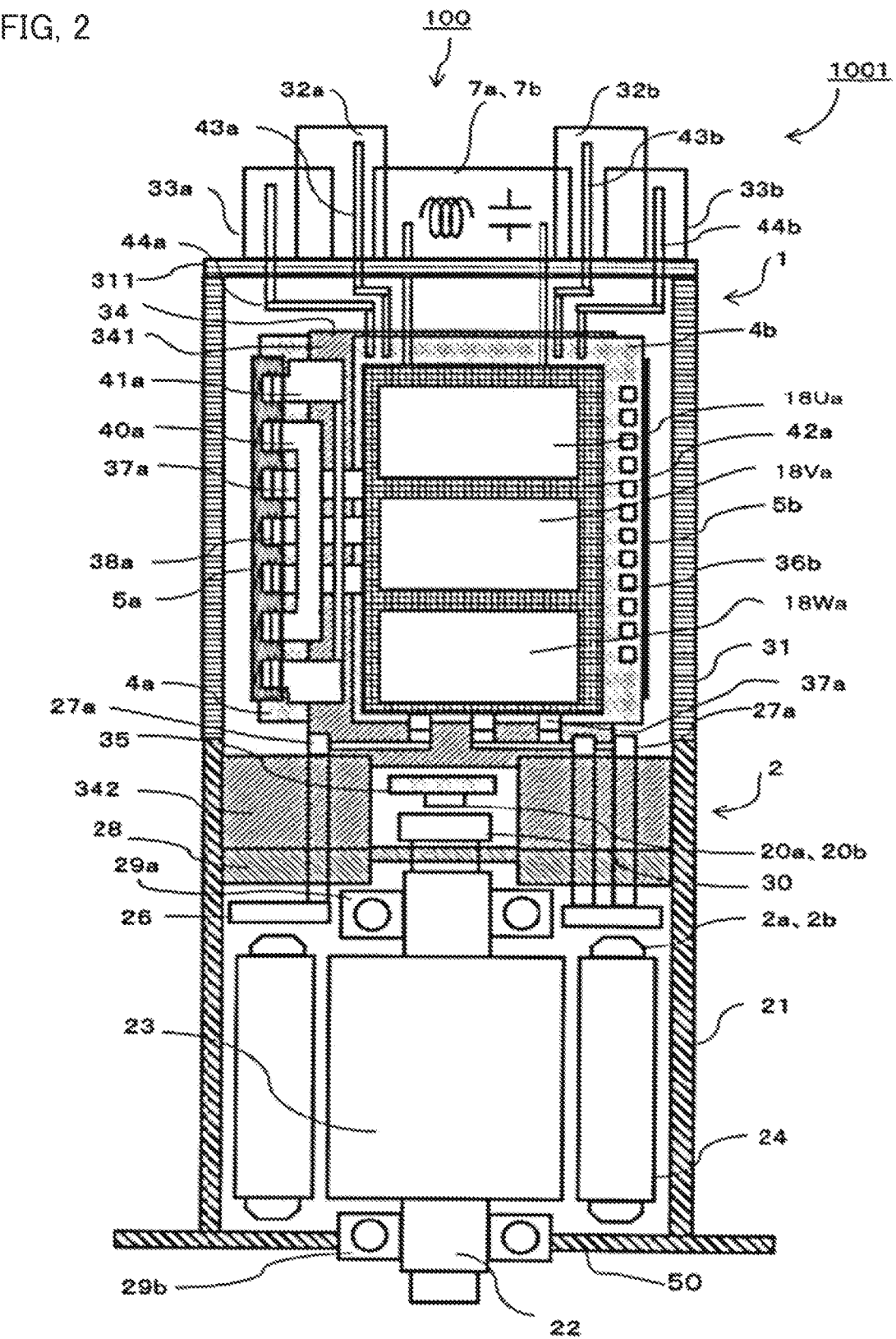
FIG. 2 is a cross-sectional view of the driving apparatus and the electric power steering apparatus according to Embodiment 1.

FIG. 2 is a cross-sectional view of the driving apparatus and the electric power steering apparatus according to Embodiment 1. In FIG. 2, the driving apparatus 1001 and the electric power steering apparatus 100 according to Embodiment 1 are roughly divided into the control unit 1 and the motor unit 2. As described above, the motor unit 2 is a brushless motor in which each of two independent three-phase windings, i.e., each of the first armature winding 2*a* and the second armature winding 2*b* is delta-connected; that is to say, it is a multiphase-winding motor. The control unit 1 is disposed in such a way that the extending direction of the center axis thereof coincides with the extending direction of the center axis of the motor unit 2, and is fixed to the axis-direction end portion, at the anti-output side, of the motor unit 2. More specifically, the motor unit 2 and the control unit 1 each have one and the same outer-diameter sizes; they are arranged in such a way as to align on one and the same center axis; they are coupled with each other, so that they are integrated with each other.

In the driving apparatus 1001 in which the motor unit 2 and the control unit 1 are integrated with each other in such a manner as described above, it is required that the control unit 1 is formed in such a way that the maximum outer diameter thereof is the same as or smaller than the maximum outer diameter of the motor unit 2. Accordingly, in Embodiment 1, there is adopted a so-called vertical-arrangement structure in which principal constituent members of the control unit 1 are vertically arranged in parallel with the extending direction of the center axis thereof, i.e., the extending direction of the output axle of the motor unit 2.

At first, the configuration of the motor unit 2 will be explained by use of FIG. 2. The motor unit 2 mainly includes an output axle 22 contained in a cylindrical tubular motor case 21, a rotor 23 fixed to the output axle 22, and a stator 24 having an inner circumferential surface that face the outer circumferential surface of the rotor 23.

The foregoing first armature winding 2*a* and the second armature winding 2*b* are wound and arranged around the stator 24. A ring-shaped wiring portion 26 disposed in the vicinity, at the upper part of the drawing, of the first armature winding 2*a* and the second armature winding 2*b* are connected with the respective end portions of the first armature winding 2*a* and the second armature winding 2*b*. Each of a first winding end portion 27*a* and a second winding end portion 27b extends from the ring-shaped wiring portion 26 in a direction in which the respective axis lines of the motor unit 2 and the control unit 1 extend, in such a way as to penetrate an after-mentioned frame 28 and an after-mentioned heat sink 34. In this situation, the first winding end portion 27a is connected with the winding end portion of the first armature winding 2a by way of the ring-shaped wiring portion 26; the second winding end portion 27b is connected with the winding end portion of the second armature winding 2b by way of the ring-shaped wiring portion 26.

Three electric conductors connected with the respective winding end portions of the U-phase winding U1, the V-phase winding V1, and the W-phase winding W1 of the first armature winding 2a are integrated with one another, so that the first winding end portion 27a is configured. Three electric conductors connected with the respective winding end portions of the U-phase winding U2, the V-phase winding V2, and the W-phase winding W2 of the second armature winding 2b are integrated with one another, so that the second winding end portion 27b is configured. Each of the first winding end portion 27a and the second winding end portion 27b is extended to the vicinity of the outer circumference, inside a housing 31, of the control unit 1.

Two or more pairs of permanent magnets (unillustrated) forming magnetic-field poles are arranged in the circumferential surface of the rotor 23. A first bearing 29a and a second bearing 29b that make a pair and pivotably support the output axle 22 are arranged at an upper part and a lower part, respectively, of the drawing with respect to the rotor 23. The first bearing 29a is disposed in the vicinity of the control unit 1 and in the central portion of the frame 28. The frame 28 functions as a boundary wall between the motor unit 2 and the control unit 1 and plays the role of a cover that seals the inside of the motor unit 2. The second bearing 29b is fixed to a structural member 50 at the output side of the motor unit 2.

An after-mentioned sensor rotor 30 is fixed to the anti-output-side end portion of the output axle 22. The first rotation sensor 20a and the second rotation sensor 20b are fixed inside the motor case 21 of the motor unit 2 in such a way as to face the axial-direction endface of the sensor rotor 30 via a gap.

Next, the configuration of the control unit 1 will be explained. The outside of the control unit 1 is covered with the cylindrical tubular housing 31. One axial-direction end of the housing 31 is coupled with one axial-direction end, at the anti-output side, of the motor case 21; the other axial-direction end thereof is sealed with a discoidal housing end wall 311. The inner endface and the outer endface of the housing end wall 311 are arranged in such a way as to be perpendicular to the axis line passing through the center axis of the output axle 22 of the motor unit 2; on the outer endface, there are provided a first power-source connector 32a and a second power-source connector 32b provided with a first power-source line 43a and a second power-source line 43b, respectively, that are each connected with the battery 8 as an external power source, and a first signal connector 33a and a second signal connector 33b provided with a first signal line 44a and a second signal line 44b, respectively, that are each connected with sensor group 11.

In addition, the first filter 7a and the second filter 7b, which are each relatively large components, are mounted on the outer endface of the housing end wall 311. Each of the first power-source connector 32a and the second power-source connector 32b is a connector in which a relatively large current of a power-source system flows; each of the first signal connector 33a and the second signal connector 33b is a connector in which a relatively small current of a signal system flows. It may be allowed that the first power-source connector 32a and the second power-source connector 32b for the power-source system and the first signal connector 33a and the second signal connector 33b for the signal system are integrated into a single connector and is disposed on the outer endface of the housing end wall 311 and that the power-source system and the signal system are separated from each other in the housing 31.

Figure 3:
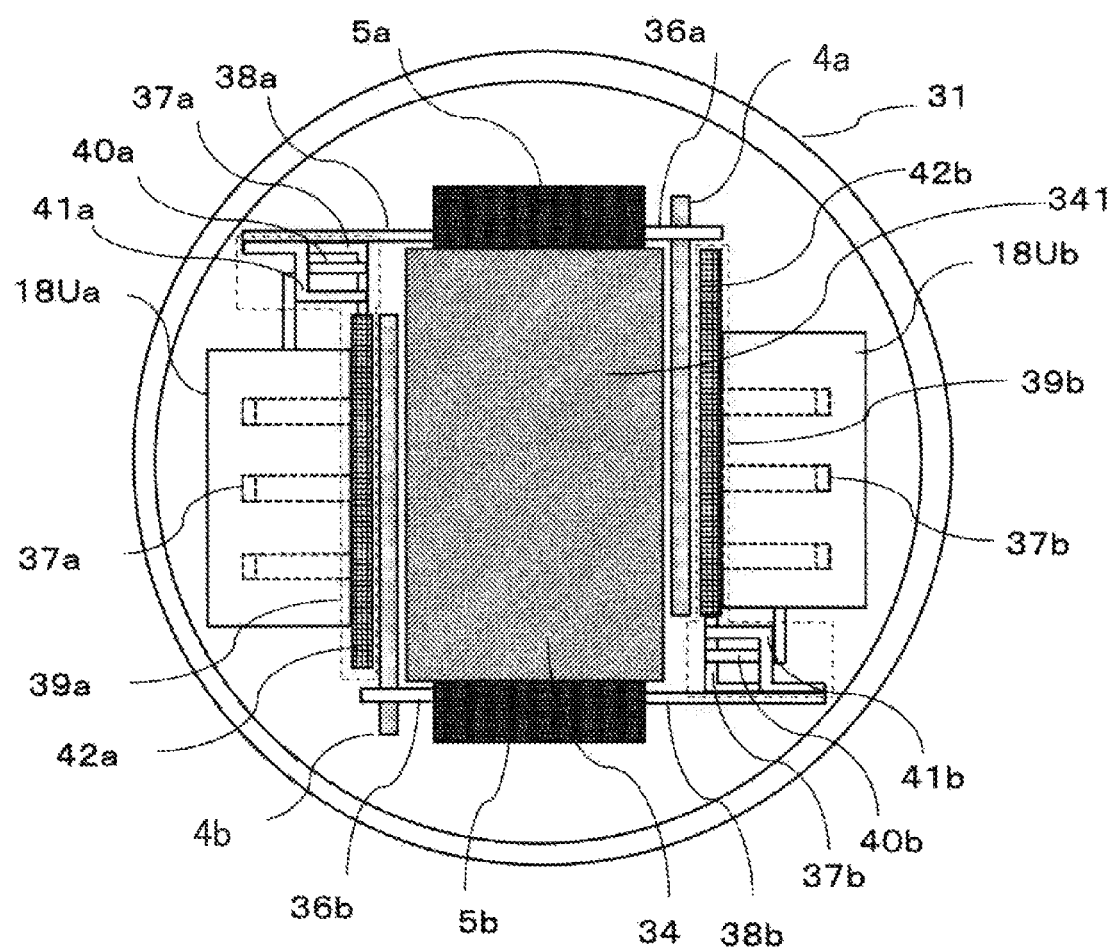
FIG. 3 is a perspective view illustrating principal parts of the driving apparatus and the electric power steering apparatus according to Embodiment 1, when viewed from a power-source connector.

FIG. 3 is a perspective view illustrating principal parts of the driving apparatus and the electric power steering apparatus according to Embodiment 1, when viewed from the power-source connector; in contrast to FIG. 2, the principal parts are illustrated in such a way as to be rotated by 90° counterclockwise with respect to the center axis. As illustrated in FIGS. 2 and 3, a columnar portion 341, of the heat sink 34, that is formed in the shape of a column whose cross section is rectangular is disposed in the inner central portion of the housing 31; as described later, in the peripheral portion of the columnar portion 341, there are arranged the first control board 4a, the second control board 4b, the first power module 5a as the first inverter circuit, the second power module 5b as the second inverter circuit, and the like.

The heat sink 34 includes the foregoing columnar portion 341 and a ring-shaped base portion 342 fixed to one longitudinal-direction end portion of the columnar portion 341. The columnar portion 341 of the heat sink 34 is disposed in the central portion of the housing 31 in such a way that the longitudinal direction thereof is along the axis line of the housing 31 of the control unit 1. The base portion 342 of the heat sink 34 is supported by the motor case 21 in such a way that the outer circumferential surface thereof is inscribed in the inner circumferential surface of the motor case 21. That is to say, the heat sink 34 is disposed in such a way that the base portion 342 thereof is fixed to the motor case 21 and that the columnar portion 341 supported in a cantilever manner by the base portion 342 protrudes toward the inner space of the housing 31.

The sensor rotor 30 fixed to the anti-output-side axis-direction end portion of the output axle 22 is disposed in the inner space of the base portion 342 of the heat sink 34 formed in the shape of a ring. The first rotation sensor 20a and the second rotation sensor 20b mounted on a circuit board 35 are disposed in the inner space of the base portion 342 of the heat sink 34 in such a way as to face the surface of the sensor rotor 30 via a gap.

The sensor rotor 30 has a pair of or two or more pairs of permanent magnets. Each of the first rotation sensor 20a and the second rotation sensor 20b that are arranged separately from each other independently detects a change in a magnetic field emitted from the permanent magnets of the sensor rotor 30 that rotates along with the output axle 22 and converts the magnetic-field change into an electric signal. It may be allowed that the first rotation sensor 20a and the second rotation sensor 20b are contained in a single package. FIG. 2 illustrates a configuration in which the first rotation sensor 20a and the second rotation sensor 20b are contained in a single package.

A set of the power supply line and the signal line of the first rotation sensor 20a and a set of the power supply line and the signal line of the second rotation sensor 20b are separately connected with the first control board 4a and the second control board 4b, respectively, by way of wiring strip conductors on the circuit board 35. The circuit board 35 is disposed in such a way as to be enclosed by the inner circumferential surface of the hollow portion formed in the base portion 342 of the heat sink 34, and is fixed to the base portion 342 of the heat sink 34. Accordingly, the circuit board 35 is formed in such a way that the surface area thereof is smaller than that of each of the first control board 4a and the second control board 4b.

Although it has been explained that each of the sensor rotor 30, the first rotation sensor 20a, and the second rotation sensor 20b is a magnetic-sensor type, each thereof may be a type other than the magnetic-sensor type, for example, either a resolver or a Hall sensor.

The first control board 4a is vertically disposed along one long-side surface of the columnar portion 341 of the heat sink 34. The second control board 4b is vertically disposed along the other long-side surface of the columnar portion 341 of the heat sink 34. In such a manner as described above, the first control board 4a and the second control board 4b are vertically arranged in such a way as to face each other through the intermediary of the columnar portion 341 of the heat sink 34. In addition, although not illustrated in FIGS. 2 and 3, as described above, the first CPU 3a, the first input circuit 12a, the first power-source circuit 10a, and the first driving circuit 13a are mounted on the first control board 4a, and the second CPU 3b, the second input circuit 12b, the second power-source circuit 10b, and the second driving circuit 13b are mounted on the second control board 4b.

The U-phase smoothing capacitor 18Ua, the V-phase smoothing capacitor 18Va, and the W-phase smoothing capacitor 18Wa in the first power module 5a are vertically arranged in such a way as to be at the outside of the first control board 4a in the radial direction of the control unit 1 and to be in parallel with the first control board 4a. The W-phase smoothing capacitor 18Wa, the V-phase smoothing capacitor 18Va, and the U-phase smoothing capacitor 18Ua are vertically arranged in that order via respective gaps from the motor unit 2 in the axial direction of the control unit 1 so as to approach the first power-source connector 32a and the first signal connector 33a in order.

The U-phase smoothing capacitor 18Ub, the V-phase smoothing capacitor 18Vb, and the W-phase smoothing capacitor 18Wb in the second power module 5b are vertically arranged in such a way as to be at the outside of the second control board 4b in the radial direction of the control unit 2 and to be in parallel with the second control board 4b. The W-phase smoothing capacitor 18Wb, the V-phase smoothing capacitor 18Vb, and the U-phase smoothing capacitor 18Ub are vertically arranged in that order via respective gaps from the motor unit 2 in the axial direction of the control unit 1 so as to approach the second power-source connector 32b and the second signal connector 33b in order.

As illustrated in FIG. 3, the columnar portion 341 of the heat sink 34 is disposed at the radial-direction central portion of the housing 31 of the control unit 1; as described above, the first control board 4a is vertically disposed along one long-side surface of the columnar portion 341 of the heat sink 34; the second control board 4b is vertically disposed along the other long-side surface of the columnar portion 341 of the heat sink 34. Then, the first power module 5a is vertically disposed along one short-side surface of the columnar portion 341 of the heat sink 34; the second power module 5b is vertically disposed along the other short-side surface of the columnar portion 341 of the heat sink 34. Accordingly, the first power module 5a and the second power module 5b are arranged in such a way as to face each other through the intermediary of the columnar portion 341 of the heat sink 34.

Because arranged as described above, the first control board 4a and the second control board 4b are separated and independent from each other; because arranged as described above, the first power module 5a and the second power module 5b are separated and independent from each other.

The first control board 4a has a shape that extends from the opposing one side face of the columnar portion 341 of the heat sink 34 in the radial direction of the control unit 1. This is because a signal terminal 36a of the first power module 5a and the first control board 4a are connected with each other. Similarly, in order to connect the signal terminal 36b of the second power module 5b with the second control board 4b, the second control board 4b has a shape that extends from the opposing other side face of the columnar portion 341 of the heat sink 34 in the radial direction of the control unit 1, i.e., in the direction opposite to the direction in which the first control board 4a extends.

The first control board 4a and the second control board 4b are arranged in point symmetry with respect to the radial-direction center of the control unit 1; the first power module 5a and the second power module 5b are arranged in point symmetry with respect to the radial-direction center of the control unit 1. Accordingly, it is made possible that each of the first winding end portion 27a and the second winding end portion 27b of the motor unit 2 is selectively connected with any one of a pair of the first control board 4a and the first power module 5a and a pair of the second control board 4b and the second power module 5b. In this regard, however, in Embodiment 1, the first winding end portion 27a is connected with the pair of the first control board 4a and the first power module 5a, and the second winding end portion 27b is connected with the pair of the second control board 4b and the second power module 5b.

A first bus bar unit 39a is mounted in such a way as to be vertically disposed at the one side surface of the columnar portion 341, of the heat sink 34, to which the first control board 4a is mounted. The first bus bar unit 39a is disposed in such a way as to face the surface, at the anti-heat-sink side, of the second control board 4b. A second bus bar unit 39b is disposed in such a way as to face the surface, at the anti-heat-sink side, of the first control board 4a.

Figure 4:
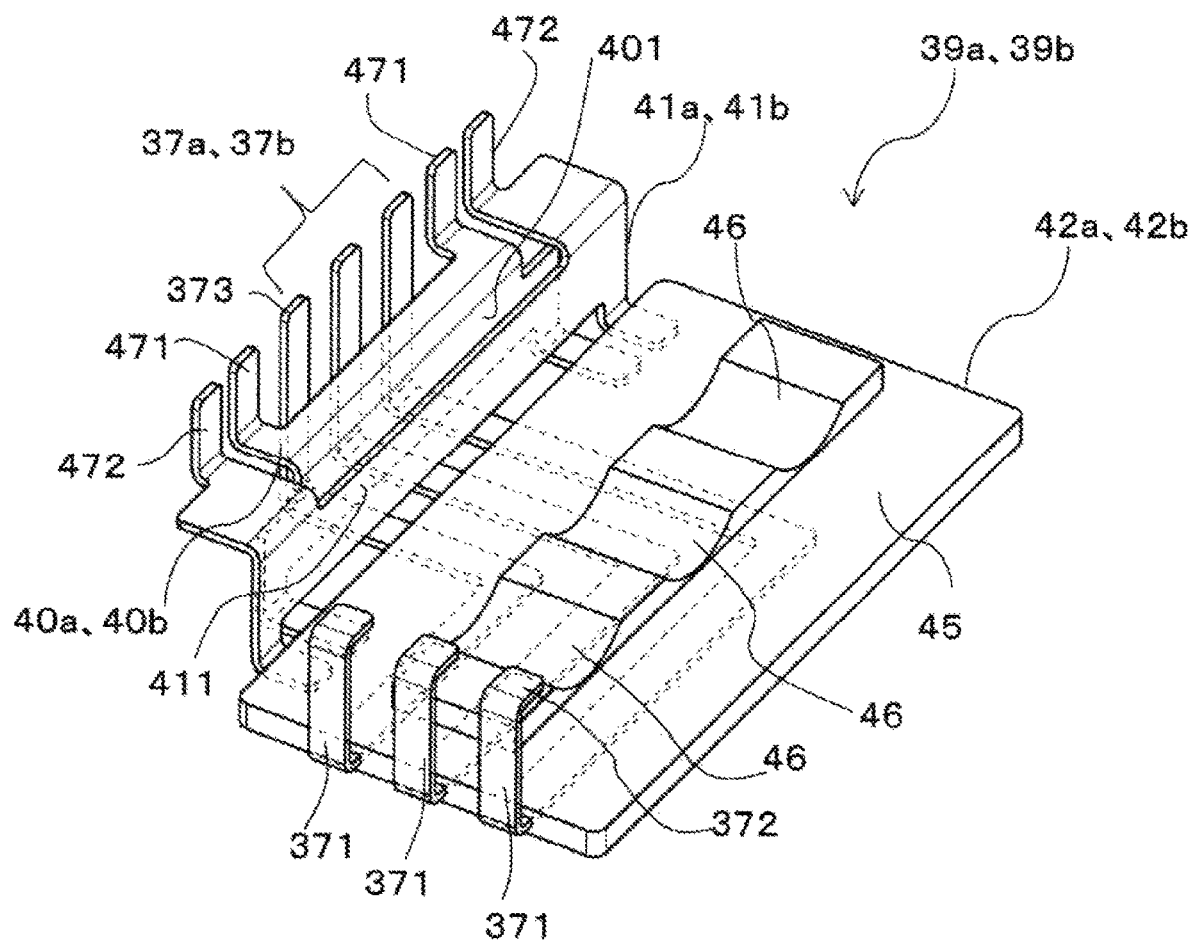
FIG. 4 is a perspective view of bus bar units in the driving apparatus and the electric power steering apparatus according to Embodiment 1.

FIG. 4 is a perspective view of the bus bar units in the driving apparatus and the electric power steering apparatus according to Embodiment 1. The first bus bar unit 39a and the second bus bar unit 39b are formed in one and the same shape; the first bus bar unit 39a is mounted in such a way as to be vertically disposed at the one side surface of the columnar portion 341, of the heat sink 34, to which the second control board 4b is mounted; the second bus bar unit 39b is mounted in such a way as to be vertically disposed at the other side surface of the columnar portion 341, of the heat sink 34, to which the first control board 4a is mounted.

In FIG. 4, the first bus bar unit 39a includes a first power-source bus bar 40a, a first grounding bus bar 41a, a first extension terminal 37a, and a first bus bar holder 42a in which some parts of the first power-source bus bar 40a, the first grounding bus bar 41a, and the first extension terminal 37a are embedded so as to be protected.

Figure 5A:
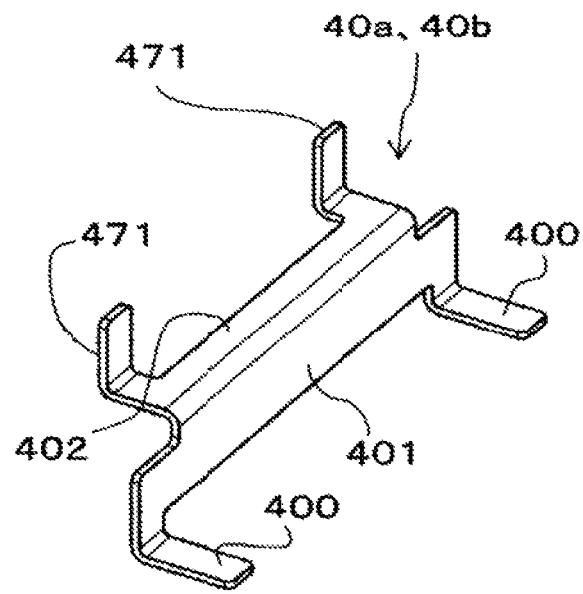
FIG. 5A is a perspective view of a power-source bus bar in the driving apparatus and the electric power steering apparatus according to Embodiment 1.

FIG. 5A is a perspective view of the power-source bus bar in the driving apparatus and the electric power steering apparatus according to Embodiment 1. In FIGS. 4 and 5A, some parts 400 of the first power-source bus bar 40a are embedded in the first bus bar holder 42a; the first power-source bus bar 40a has a first bending portion 401 that is bent at a right angle from the embedded parts 400 toward the anti-heat-sink side, i.e., that is bent at a right angle from a first surface 45, which is the surface, at the anti-heat-sink side, of the first bus bar holder 42a, a second bending portion 402 that is bent at a right angle from the first bending portion 401 toward the anti-bus-bar holder side, and a terminal portion 471 that is bent at a right angle from the second bending portion 402 toward the anti-heat-sink side.

Figure 5B:
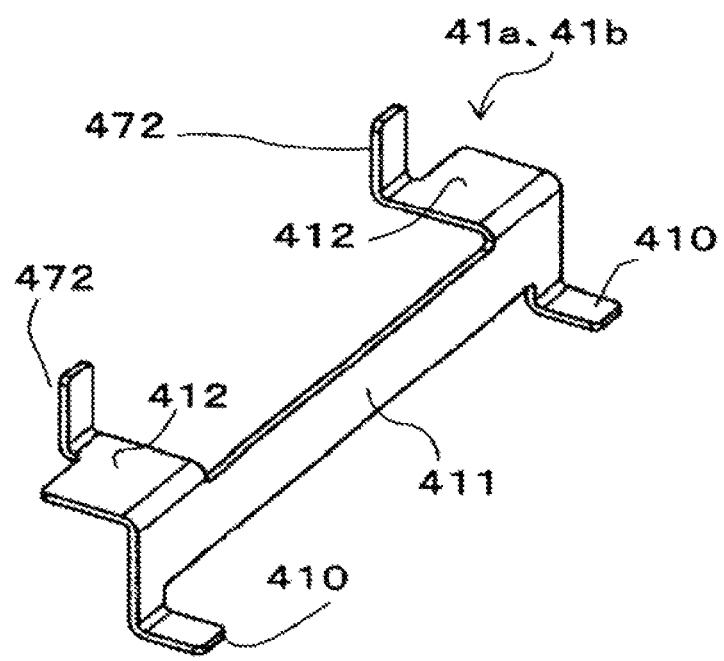
FIG. 5B is a perspective view of a grounding bus bar in the driving apparatus and the electric power steering apparatus according to Embodiment 1.

FIG. 5B is a perspective view of the grounding bus bar in the driving apparatus and the electric power steering apparatus according to Embodiment 1. In FIGS. 4 and 5B, some parts 410 of the first grounding bus bar 41a are embedded in the first bus bar holder 42a; the first grounding bus bar 41a has a first bending portion 411 that is bent at a right angle from the embedded parts 410 toward the anti-heat-sink side, i.e., that is bent at a right angle from the first surface 45, which is the surface, at the anti-heat-sink side, of the first bus bar holder 42a, a second bending portion 412 that is bent at a right angle from the first bending portion 411 toward the anti-bus-bar-holder side, and a terminal portion 472 that is bent at a right angle from the second bending portion 412 toward the anti-heat-sink side.

A side surface of the second bending portion 412 of the first grounding bus bar 41a faces a corresponding side surface of the second bending portion 402 of the first power-source bus bar 40a. A side surface of the terminal portion 472 of the first grounding bus bar 41a faces a corresponding side surface of the terminal portion 471 of the first power-source bus bar 40a.

The first extension terminal 37a includes three independent electric conductors; at the respective central portions thereof, these three electric conductors are bent at a right angle in an edgewise direction and are embedded in the first bus bar holder 42a. Each of the three electric conductors of the first extension terminal 37a has a first bending portion 371 that is extended from the central portion where it is embedded to one short-side surface of the first bus bar holder 42a and then is bent at a right angle toward the anti-heat-sink side, i.e., from the first surface 45 of the first bus bar holder 42a, a second bending portion 372 that is bent at a right angle from the first bending portion 371 toward the first bus bar holder 42a, and an extension-terminal terminal portion 373 that is extended from the central portion where it is embedded to one long-side surface of the first bus bar holder 42a and then is bent at a right angle toward the anti-heat-sink side. A side surface of the extension-terminal terminal portion 373 of the first extension terminal 37a faces a corresponding side surface of the terminal portion 471 of the first power-source bus bar 40a.

In the first surface 45, which is its surface at the anti-heat-sink side, the first bus bar holder 42a formed of an insulating resin is provided with three housing recesses 46 in each of which corresponding one of the W-phase smoothing capacitor 18Wb, the V-phase smoothing capacitor 18Vb, and the U-phase smoothing capacitor 18Ub of the first power module 5a is disposed.

The second bus bar unit 39b and the foregoing first bus bar unit 39a are configured in one and the same manner; as illustrated in FIG. 4, the second bus bar unit 39b includes a second power-source bus bar 40b, a second grounding bus bar 41b, a second extension terminal 37b, and a second bus bar holder 42b in which some parts of the second power-source bus bar 40b, the second grounding bus bar 41b, and the second extension terminal 37b are embedded so as to be protected.

As illustrated in FIGS. 2 and 3, the first bus bar unit 39a configured in such a manner as described above is vertically disposed at the anti-heat-sink side of the second control board 4b and is to be fixed to the columnar portion 341 of the heat sink 34. The positive-polarity line of the first power-source line 43a, which is provided through the first power-source connector 32a, is connected with the positive-polarity side of the first filter 7a (refer to FIG. 1) and then is connected with the first power-source bus bar 40a in the first bus bar unit 39a. Each of the terminal portions 471 of the first power-source bus bar 40a is connected with a positive-polarity terminal out of two or more output terminals 38a of the first power module 5a. Each of the terminal portions 472 of the first grounding bus bar 41a in the first bus bar unit 39a is connected with a grounding terminal out of the two or more output terminals 38a of the first power module 5a. The signal line 44a from the first signal connector 33a is directly connected with the first input circuit 12a in the first control board 4a.

The three respective first extension terminals 37a in the first bus bar unit 39a are connected with the U-phase terminal, the V-phase terminal, and the W-phase terminal out of the two or more output terminals 38a of the first power module 5a. The respective second bending portions 372 of the three first extension terminals 37a are connected with the U-phase terminal, the V-phase terminal, and the W-phase terminal in the first winding end portion 27a extending in such a way as to penetrate the base portion 342 of the heat sink 34. The first winding end portion 27a including the U-phase, V-phase, and W-phase terminals is disposed at the outside of the first control board 4a in the radial direction of the control unit 1 and is connected with the output terminal 38a of the first power module 5a, through the intermediary of the first extension terminal 37a; the second winding end portion 27b including the U-phase, V-phase, and W-phase terminals is disposed at the outside of the second control board 4b in the radial direction of the control unit 1 and is connected with the output terminal 38b of the second power module 5b, through the intermediary of the second extension terminal 37b.

The U-phase smoothing capacitor 18Ua, the V-phase smoothing capacitor 18Va, and the W-phase smoothing capacitor 18Wa in the first power module 5a are mounted and fixed in the three respective housing recesses 46 of the first bus bar holder 42a.

The first bending portion 401 provided in each of the first power-source bus bar 40a and the second power-source bus bar 40b is formed in such a way that the width thereof is larger than the width of the terminal portion 471 provided in each of the first power-source bus bar 40a and the second power-source bus bar 40b. The first bending portion 411 provided in each of the first grounding bus bar 41a and the second grounding bus bar 41b is formed in such a way that the width thereof is larger than the width of the terminal portion 472 provided in each of the first grounding bus bar 41a and the second grounding bus bar 41b.

The first bending portion 401 of the first power-source bus bar 40a and the first bending portion 411 in the first grounding bus bar 41a are arranged between the first power module 5a and the U-phase smoothing capacitor 18Ua/the V-phase smoothing capacitor 18Va/the W-phase smoothing capacitor 18Wa; as well illustrated in FIG. 4, the surface of the first bending portion 401 in the first power-source bus bar 40a and the first bending portion 411 in the first grounding bus bar 41a are arranged in such a way as to face each other.

Similarly, the first bending portion 401 in the second power-source bus bar 40b and the first bending portion 411 in the second grounding bus bar 41b are arranged between the second power module 5b and the U-phase smoothing capacitor 18Ub/the V-phase smoothing capacitor 18Vb/the W-phase smoothing capacitor 18Wb; the surface of the first bending portion 401 in the second power-source bus bar 40b and the first bending portion 411 in the second grounding bus bar 41b are arranged in such a way as to face each other.

It may be allowed that any one of the first power-source bus bar 40a and the first grounding bus bar 41a is disposed closer to the first power module 5a than the other thereof; FIG. 4 illustrates the case where the first power-source bus bar 40a is disposed closer to the first power module 5a. Similarly, it may be allowed that any one of the second power-source bus bar 40b and the second grounding bus bar 41b is disposed closer to the second power module 5b than the other thereof; FIG. 4 illustrates the case where the second power-source bus bar 40b is disposed closer to the second power module 5b.

Production of the first bus bar unit 39a including the first power-source bus bar 40a, the first grounding bus bar 41a, and the first bus bar holder 42a and the production of the second bus bar unit 39b including the second power-source bus bar 40b, the second grounding bus bar 41b, and the second bus bar holder 42b can be performed through integral molding, press-fitting, snap fitting, or the like. FIG. 4 illustrates the case where the productions are performed by fixing respective copper members to the first bus bar holder 42a and the second bus bar holder 42b through integral molding.

Heretofore, there have been described the arrangement of and the connection relationships among the constituent members in the first control system including the first armature winding 2a and the first control unit 1a of a redundant system; the arrangement of and the connection relationships among the constituent members in the second control system including the second armature winding 2b and the second control unit 1b are the same as those of the first control system.

Next, there will be explained the effects to be obtained from the driving apparatus 1001 and the electric power steering apparatus 100, configured as described above, according to Embodiment 1. When in the first control system, the inductance in the supply path, of driving electric power for the motor unit 2, that includes the first bus bar unit 39a, the first power-source bus bar 40a, and the first grounding bus bar 41a increases, noise signals such as a surge current and a surge voltage in the two or more semiconductor devices in the first power module 5a may increase and hence heat generation may be enhanced. Therefore, it is required that the respective surface areas of the first power-source bus bar 40a and the first grounding bus bar 41a are large and that the respective wiring distances between the output terminal 38a of the first power module 5a and the first power-source bus bar 40a and between the output terminal 38a and the first grounding bus bar 41a are short. The same applies to the second control system.

In Embodiment 1, in the first control system, the first bending portion 401 is provided in the first power-source bus bar 40a and the first bending portion 411 is provided in the first grounding bus bar 41a; these first bending portions 401 and 411 are arranged in such a way as to face each other; part of the first extension terminal 37a is embedded in the first bus bar holder 42a; as a result, a space can be provided on the first surface 45 of the first bus bar holder 42a. The same applies to the second control system.

By effective use of the foregoing spaces on the respective first surfaces 45 of the first bus bar holder 42a and the second bus bar holder 42b, the U-phase smoothing capacitor 18Ua, the V-phase smoothing capacitor 18Va, and the W-phase smoothing capacitor 18Wa of the first power module and the U-phase smoothing capacitor 18Ub, the V-phase smoothing capacitor 18Vb, and the W-phase smoothing capacitor 18Wb of the second power module are arranged at the radial-direction outside in the housing 31; as a result, it is made possible to downsize the product, especially to reduce the radial-direction area of the control unit.

Moreover, the first bending portion 401 having a width larger than the width of the terminal portion 471 of the first power-source bus bar 40a and the first bending portion 411 having a width larger than the width of the terminal portion 472 of the first grounding bus bar 41a are provided, so that it is made possible that the respective surface areas of the first power-source bus bar 40a, the second power-source bus bar 40b, the first grounding bus bar 41a, and the second grounding bus bar 41b are made large and hence the respective inductances of these bus bars are reduced.

Moreover, in the first control system, the first power-source bus bar 40a and the first grounding bus bar 41a are arranged in the vicinity of the output terminal 38a of the first power module 5a so that the U-phase smoothing capacitor 18Ua, the V-phase smoothing capacitor 18Va, and the W-phase smoothing capacitor 18Wa are arranged at the radial-direction outside in the housing 31; the arrangement in the second control system is made in the same manner; thus, because the thickness of the heat sink 34 can be made large, the heat-radiation performance is raised.

Furthermore, in the first control system, the first bending portion 401 of the first power-source bus bar 40a and the first bending portion 411 of the first grounding bus bar 41a are arranged between the first control board 4a and the first power module 5a so that a space is secured above the first control board 4a; the arrangement in the second control system is made in the same manner; thus, it is made possible that the mountable area of the components to be mounted on the first control board 4a and the second control board 4b is expanded.

Furthermore, in the first control system, the first bending portions 401 and 411 are bent toward the opposite side of the heat sink 34, so that it is made possible that the radial-direction area of the control unit 1 is reduced and that there is secured a space for configuring a tool, for example, an arc-welding chuck tool required when the output terminals 38a of the first power module 5a and the respective corresponding terminal portions 471, 472, and 373 of the first bus bar unit 39a are welded with each other. The same applies to the second control system.

As described above, in the case of an electric power steering apparatus having two pieces each of independent motor armature windings and control systems such as control units, it is made possible to provide an apparatus in which the radial-direction area of the control unit is reduced and the heat-radiation performance is high.

Embodiment 2

Next, a driving apparatus and an electric power steering apparatus according to Embodiment 2 will be explained based on the drawings. Embodiment 1 is an electric power steering apparatus having two pieces each of independent motor armature windings and control systems such as control units; however, Embodiment 2 is an electric power steering apparatus having one piece each of a motor armature winding and a control system such as a control unit.

Figure 6:
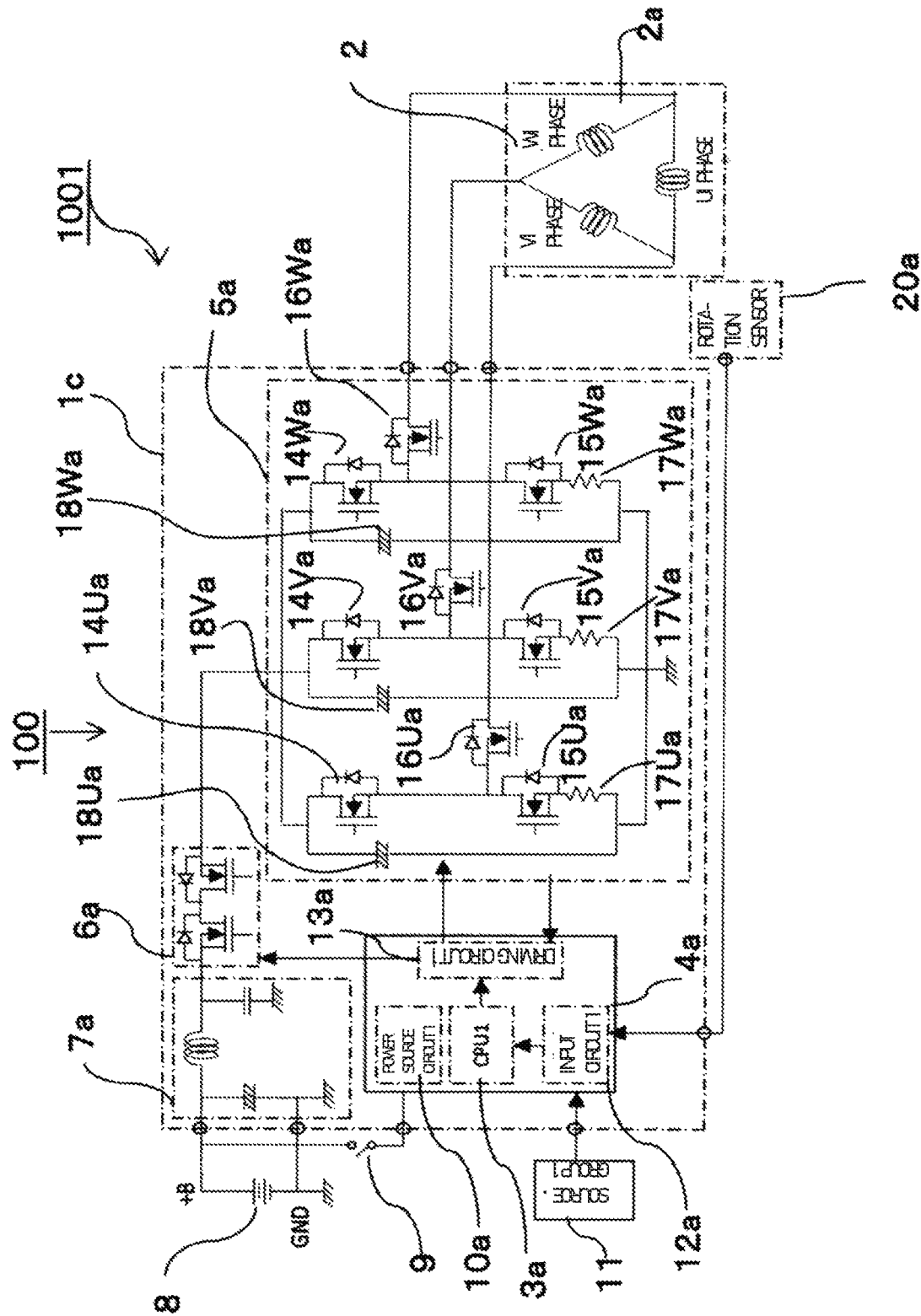
FIG. 6 is an overall circuit diagram of a driving apparatus and an electric power steering apparatus according to Embodiment 2.

FIG. 6 is an overall circuit diagram of a driving apparatus and an electric power steering apparatus according to Embodiment 2. In FIG. 6, the motor unit 2 is a brushless motor in which a three-phase armature winding 2a is delta-connected. The control unit 1 has a single control system and is configured in the same manner as the first control unit 1a or the second control unit 1b in FIG. 1 of Embodiment 1 is configured; the operation thereof is substantially the same as that of the first control unit 1a or the second control unit 1b in FIG. 1 of Embodiment 1. In FIG. 6, as is the case with FIG. 1, the reference character "a" is provided to the constituent elements corresponding to those in the first control system in FIG. 1.

Figure 7:
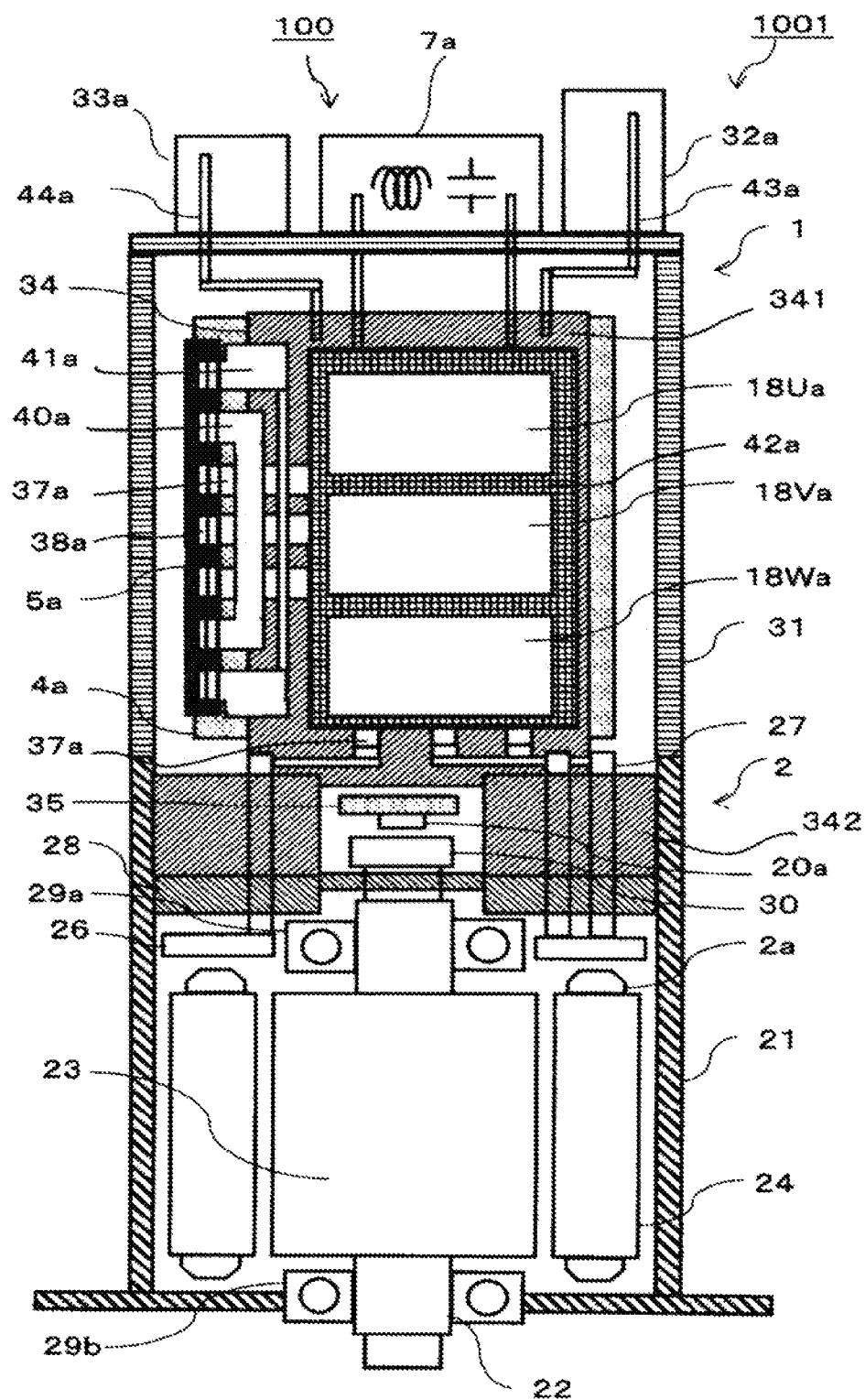
FIG. 7 is a cross-sectional view of the driving apparatus and the electric power steering apparatus according to Embodiment 2.

FIG. 7 is a cross-sectional view of the driving apparatus and the electric power steering apparatus according to Embodiment 2. In FIG. 6, as is the case with FIG. 2, the reference character "a" is provided to the constituent elements corresponding to those in the first control system in FIG. 2. In addition, in the other the constituent elements, portions corresponding to those in FIG. 2 each have reference characters the same as those in FIG. 2. In FIG. 7, the motor unit 2 is provided with the armature winding 2a. In the control unit 1, the outer circumference portion is covered with the housing 31; a power-source connector 32a to be connected with an external power source and two or more signal connectors 33a to be connected with the sensor group 11 are arranged on the anti-output-side axis-direction endface. A filter 7a, which is a relatively large component, and the like are mounted on a surface that is one and the same as the surface on which the power-source connector 32a and the signal connectors 33a are arranged and that is perpendicular to the output axle 22.

In the housing 31, the columnar portion 341 of the heat sink 34 is disposed in the central portion thereof; a control board 4a, a power module 5a, and the like are arranged around the columnar portion 341. The base portion 342 of the heat sink 34 is in the shape of a circle that is inscribed in the motor case 21. As is the case with FIG. 2, the sensor rotor 30 is mounted in the hollow portion of the central portion of the base portion 342 in such a way as to be fixed to the anti-output-side end of the output axle 22. As is the case with FIG. 2, the first power-source line 43a and the various types of first signal lines 44a are electrically connected with the bus bars and the smoothing capacitors 18Ua, 18Va, and 18Wa.

Figure 8:
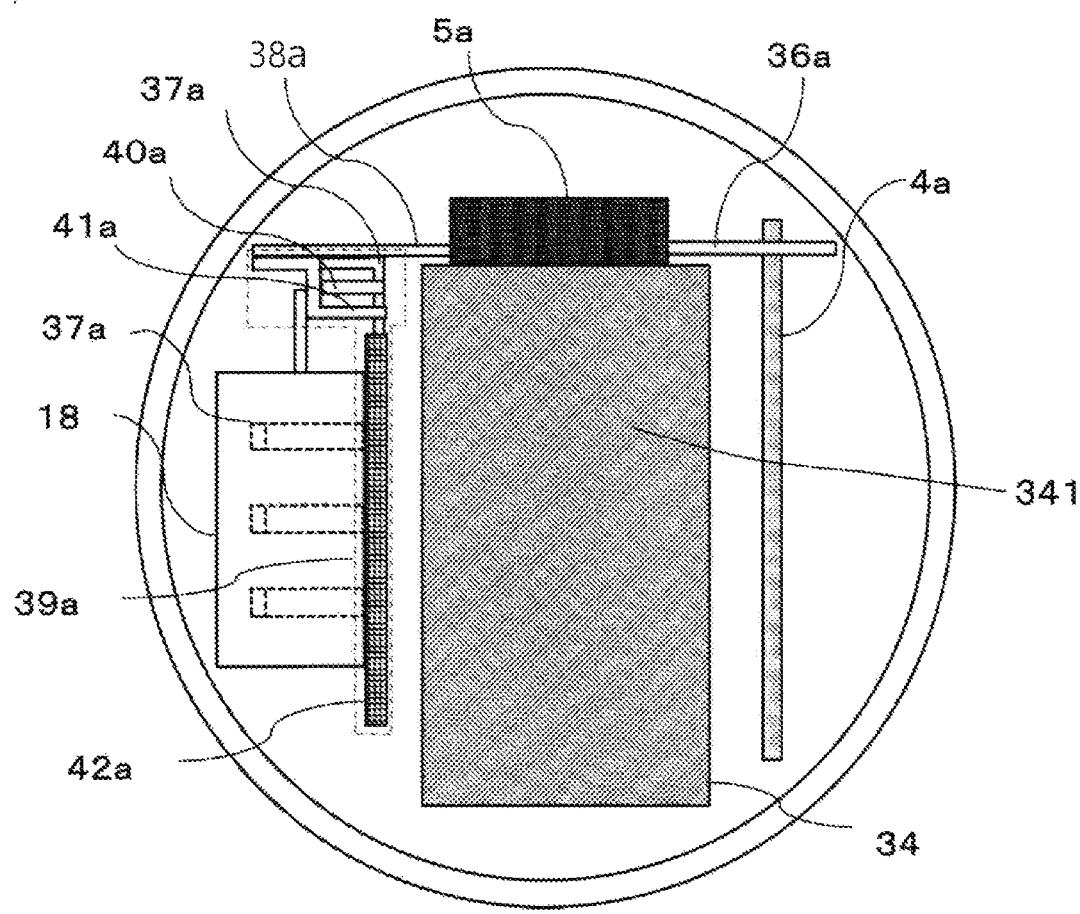
FIG. 8 is a perspective view illustrating principal parts of the driving apparatus and the electric power steering apparatus according to Embodiment 2, when viewed from a power-source connector.

FIG. 8 is a perspective view illustrating principal parts of the driving apparatus and the electric power steering apparatus according to Embodiment 2, when viewed from the power-source connector. In FIG. 8, as is the case with FIG. 3, the reference character "a" is provided to the constituent elements corresponding to those in the first control system in FIG. 3. In addition, in the other the constituent elements, portions corresponding to those in FIG. 3 each have reference characters the same as those in FIG. 3. In FIG. 8, the substantially rectangular-parallelepiped columnar portion 341 of the heat sink 34 is disposed in the radial-direction central portion; the control board 4a is vertically disposed along the peripheral portion of the columnar portion 341; furthermore, the power module 5a is disposed in such a way as to adhere to one side of the columnar portion 341 adjacent to the control board 4a. A bus bar unit 39a is disposed on a plane that faces the control board 4a via the columnar portion 341.

The configuration of the bus bar unit 39a is the same as the foregoing configuration illustrated in FIG. 4. Respective terminals U, V, and W of the winding end portion 27 are arranged at the radial-direction outer circumference portion with respect to the control board 4a and are connected with the output terminals 38a of the power module 5a through the intermediary of the bus bar unit 39a. The circuit board 35 is disposed in the hollow portion that penetrates the base portion 342 of the heat sink 34.

Next, there will be explained the effects to be obtained from the driving apparatus and the electric power steering apparatus, configured as described above, according to Embodiment 2. As is the case with Embodiment 1, the first bending portion 401 is provided in the power-source bus bar 40a and the first bending portion 411 is provided in a grounding bus bar 41a; these bending portions 401 and 411 are arranged in such a way as to face each other; then, by effective use of a vacant space on the first surface 45 of a bus bar holder 42a, smoothing capacitors such as the smoothing capacitor 18Ua and the like are arranged; as a result, it is made possible to downsize the product, especially to reduce the radial-direction area of the control unit.

Moreover, the first bending portion 401 having a width larger than the width of the terminal portion 471 of the power-source bus bar 40a and the first bending portion 411 having a width larger than the width of the terminal portion 472 of the grounding bus bar 41a are provided, so that the respective surface areas of the power-source bus bar 40a and the grounding bus bar 41a are made larger so as to reduce the respective inductances of the bus bars; concurrently, the power-source bus bar 40a and the grounding bus bar 41a are arranged close to the output terminal 38a of the power module 5a, so that the thickness of the heat sink 34 under the smoothing capacitor 18 can be made larger and hence the heat-radiation performance is raised.

Moreover, the first bending portion 401 of the power-source bus bar 40a and the first bending portion 411 of the grounding bus bar 41a are bent toward the anti-heat-sink side, so that it is made possible that the radial-direction area of the control unit 1 is reduced and that there is secured a space for configuring a tool required when the output terminals 38a of the power module 5a and the respective corresponding terminal portions 471, 472, and 373 of the bus bar unit 39a.

As described above, also in the case of a driving apparatus and an electric power steering apparatus that have one piece each of a motor-unit armature winding and a control system such as a control unit, it is made possible to provide an apparatus in which the radial-direction area of the control unit 1 is reduced and the heat-radiation performance is high.

Embodiment 3

Figure 9:
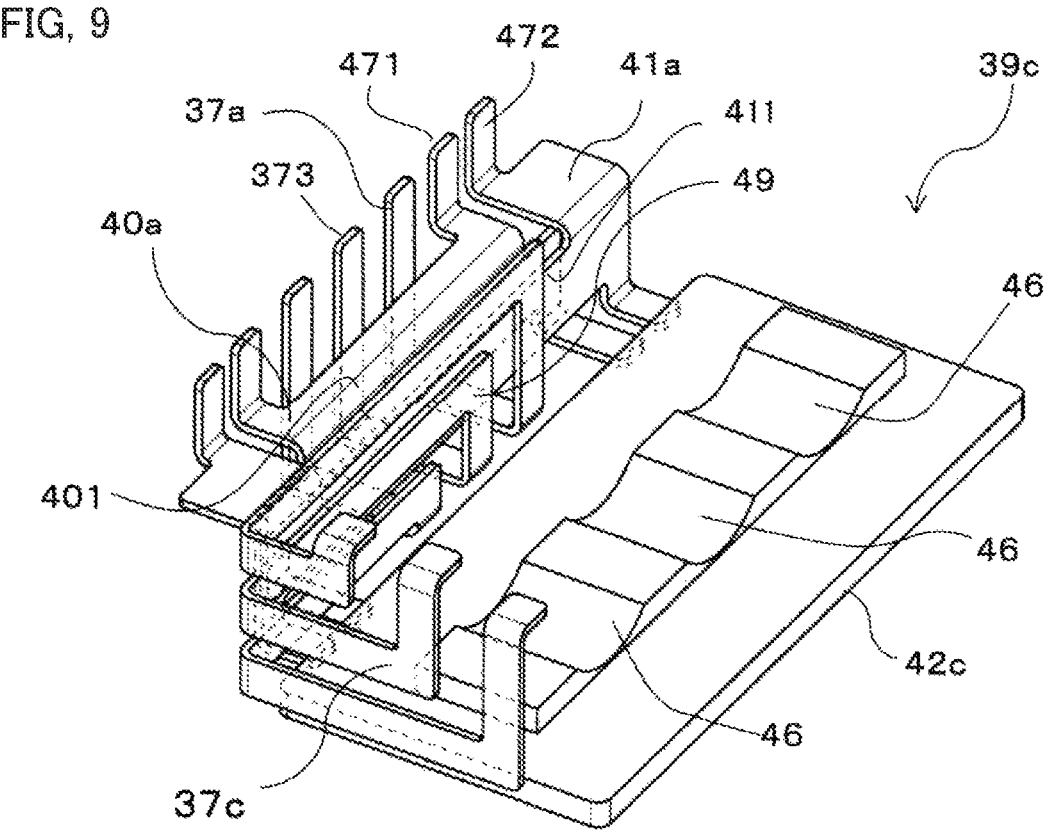
FIG. 9 is a perspective view of a bus bar unit in a driving apparatus and an electric power steering apparatus according to Embodiment 3.

Embodiment 3 is a variant example of each of Embodiments 1 and 2 and further raises the heat-radiation performance of the power module 5a. FIG. 9 is a perspective view of bus bar units in a driving apparatus and an electric power steering apparatus according to Embodiment 3. As illustrated in FIG. 9, Embodiment 3 is characterized in that a bending portion 49 of an extension terminal 37c in a bus bar unit 39c is disposed in such a way as to face the first bending portion 401 of the power-source bus bar 40a and the first bending portion 411 of the grounding bus bar 41a. The extension terminal 37c is not embedded in a bus bar holder 42c. The bus bar unit according to Embodiment 3 can be utilized instead of the bus bar unit according to any one of Embodiments 1 and 2.

The arrangement order of the power-source bus bar 40a, the grounding bus bar 41a, and the extension terminal 37c is not limited to that in FIG. 9 but can arbitrarily be configured.

The effects to be obtained from the driving apparatus and the electric power steering apparatus that are provided a bus bar unit configured in such a manner as described above are as follows. That is to say, because in Embodiment 3, the extension terminal 37c is not embedded in the bus bar holder 42c, it is made possible that the thickness of the bus bar holder 42c is reduced and hence the thickness of the heat sink 34 is made larger; thus, the heat-radiation performance is raised. Moreover, because the contact area between the extension terminal 37c where a large current flows and the bus bar holder 42c becomes smaller, it is made possible to suppress fusion of the bus bar holder 42c at a time when a current is applied.

Although the present application is described above in terms of various exemplary embodiments and implementations, it should be understood that the various features, aspects and functions described in one or more of the individual embodiments are not limited in their applicability to the particular embodiment with which they are described, but instead can be applied, alone or in various combinations to one or more of the embodiments. Therefore, an infinite number of unexemplified variant examples are conceivable within the range of the technology disclosed in the present application. For example, there are included the case where at least one constituent element is modified, added, or omitted and the case where at least one constituent element is extracted and then combined with constituent elements of other embodiments.

DESCRIPTION OF REFERENCE NUMERALS

1: control unit
1a: first control unit
1b: second control unit
2: motor unit
2a: first armature winding
2b: second armature winding
3a: first CPU
3b: second CPU
4a: first control board
4b: second control board
5a: first power module
5b: second power module
6a: first power-source-relay switching device
6b: second power-source-relay switching device
7a: first filter
7b: second filter
8: battery
9: ignition switch
10a: first power-source circuit
10b: second power-source circuit
11: sensor group
12a: first input circuit
12b: second input circuit
13a: first driving circuit
13b: second driving circuit
14Ua, 14Ub: U-phase upper-arm switching device
14Va, 14Vb: V-phase upper-arm switching device
14Wa, 14Wb: W-phase upper-arm switching device
15Ua, 15Ub: U-phase lower-arm switching device
15Va, 15b: V-phase lower-arm switching device
15Wa, 15Wb: W-phase lower-arm switching device
16Ua, 16Ub: U-phase motor-relay switching device
16Va, 16Vb: V-phase motor-relay switching device
16Wa, 16Wb: W-phase motor-relay switching device
17Ua, 17Ub: U-phase shunt resistor
17Va, 17Vb: V-phase shunt resistor
17Wa, 17Wb: W-phase shunt resistor
18Ua, 18Ub: U-phase smoothing capacitor
18Va, 18Vb: V-phase smoothing capacitor
18Wa, 18Wb: W-phase smoothing capacitor
19: communication line
20a: first rotation sensor
20b: second rotation sensor
21: motor case
22: output axle
23: rotor
24: stator
26: ring-shaped wiring portion
27a: first winding end portion
27b: second winding end portion
28: frame
29a: first bearing
29b: second bearing
30: sensor rotor
31: housing
32a: first power-source connector
32b: second power-source connector
33a: first signal connector
33b: second signal connector
34: heat sink
341: columnar portion
342: base portion
35: circuit board
36a, 36b: signal terminal
37a: first extension terminal
37b: second extension terminal
37c: extension terminal
38a, 38b: output terminal
39a: first bus bar unit
39b: second bus bar unit
39c: bus bar unit
40a: first power-source bus bar
40b: second power-source bus bar
41a: first grounding bus bar
41b: second grounding bus bar
42a, 42b, 42c: bus bar holder
43a: first power-source line
43b: second power-source line
44a: first signal line
44b: second signal line
45: first surface
46: housing recess
471, 472: terminal portion
373: extension-terminal terminal portion
401, 411, 49: bending portion
100: electric power steering apparatus
1001: driving apparatus

The invention claimed is:

1. A driving apparatus comprising:
a motor unit that generates driving force for driving a body to be driven; and
a control unit that is disposed in such a way that an extending direction of the center axis thereof coincides with an extending direction of the center axis of the motor unit and is fixed to an axis-direction end portion, at the anti-output side, of the motor unit,
wherein the control unit includes
a power module having two or more switching devices that supply a current to the motor unit,
a smoothing capacitor that smooths the current,
a calculation circuit that outputs a control signal to the power module,
a control board on which the calculation circuit is mounted,
a bus bar unit having terminals for electrically connecting the power module with an external connector, and
a heat sink for cooling at least the power module,
wherein the bus bar unit includes a power-source bus bar to be connected with a positive-polarity side of a power source, a grounding bus bar to be connected with a negative-polarity side of the power source, an extension terminal to be connected with an output terminal of the power module, and a bus bar holder that holds the power-source bus bar and the grounding bus bar, wherein each of the power-source bus bar and the grounding bus bar has a terminal portion to be connected with the output terminal of the power module and a bending portion bent in a direction perpendicular to a first surface of the bus bar holder, wherein the bending portion is disposed between the smoothing capacitor and the power module, and wherein the power-source bus bar and the grounding bus bar are arranged in such a way as to face each other.

2. The driving apparatus according to claim 1, wherein at least part of the extension terminal is embedded in the bus bar holder.

3. The driving apparatus according to claim 2, wherein the width of the bending portion in the power-source bus bar is set to be larger than the width of the terminal portion in the power-source bus bar.

4. The driving apparatus according to claim 2,
wherein the extension terminal has a bending portion, and
wherein said bending portion is disposed in such a way as to face the respective bending portions of the power-source bus bar and the grounding bus bar.

5. The driving apparatus according to claim 1, wherein the respective bending portions of the power-source bus bar and the grounding bus bar are bent toward an anti-heat-sink side.

6. The driving apparatus according to claim 5,
wherein the extension terminal has a bending portion, and
wherein said bending portion is disposed in such a way as to face the respective bending portions of the power-source bus bar and the grounding bus bar.

7. The driving apparatus according to claim 1, wherein the respective bending portions of the power-source bus bar and the grounding bus bar are arranged between the power module and the control board.

8. The driving apparatus according to claim 1, wherein the width of the bending portion in the power-source bus bar is set to be larger than the width of the terminal portion in the power-source bus bar.

9. The driving apparatus according to claim 1,
wherein the extension terminal has a bending portion, and
wherein said bending portion is disposed in such a way as to face the respective bending portions of the power-source bus bar and the grounding bus bar.

10. An electric power steering apparatus comprising the driving apparatus according to claim 1,
wherein assist torque corresponding to steering torque exerted on a steering shaft by a vehicle driver is generated by the driving apparatus, and
wherein the generated assist torque is exerted on the steering shaft.

11. A driving apparatus comprising:
a motor unit that has a first armature winding and a second armature winding that are independent from each other and generates driving force for driving a body to be driven; and
a control unit that is disposed in such a way that an extending direction of the center axis thereof coincides with an extending direction of the center axis of the motor unit and is fixed to an axis-direction end portion, at the anti-output side, of the motor unit, wherein the control unit includes a first control unit that controls a current flowing in the first armature winding and a second control unit that controls a current flowing in the second armature winding, wherein the first control unit includes
a first power module having two or more switching devices that supply a current to the first armature winding,
a first smoothing capacitor that smooths a current in the first armature winding,
a first calculation circuit that outputs a control signal to the first power module,
a first control board on which the first calculation circuit is mounted, and
a first bus bar unit having terminals for electrically connecting the first power module with an external connector, wherein the first bus bar unit includes
a first power-source bus bar to be connected with a positive-polarity side of a power source,
a first grounding bus bar to be connected with a negative-polarity side of the power source,
a first extension terminal to be connected with an output terminal of the first power module, and
a first bus bar holder that holds the first power-source bus bar, the first grounding bus bar, and the first extension terminal, wherein each of the first power-source bus bar and the first grounding bus bar has a first terminal portion to be connected with the output terminal of the first power module, and a bending portion bent in a direction perpendicular to a first surface of the first bus bar holder, wherein the bending portion is disposed between the first smoothing capacitor and the first power module, wherein the first power-source bus bar and the first grounding bus bar are arranged in such a way as to face each other, wherein the second control unit includes
a second power module having two or more switching devices that supply a current to the second armature winding,
a second smoothing capacitor that smooths a current in the second armature winding,
a second calculation circuit that outputs a control signal to the second power module,
a second control board on which the second calculation circuit is mounted, and
a second bus bar unit having terminals for electrically connecting the second power module with an external connector, wherein the second bus bar unit includes
a second power-source bus bar to be connected with a positive-polarity side of a power source,
a second grounding bus bar to be connected with a negative-polarity side of the power source,
a second extension terminal to be connected with an output terminal of the second power module, and
a second bus bar holder that holds the second power-source bus bar, the second grounding bus bar, and the second extension terminal, wherein each of the second power-source bus bar and the second grounding bus bar has a second terminal portion to be connected with the output terminal of the second power module and a bending portion bent in a direction perpendicular to a first surface of the second bus bar holder, wherein the bending portion is disposed between the second smoothing capacitor and the second power module, wherein the second power-source bus bar and the second grounding bus bar are arranged in such a way as to face each other, and wherein a heat sink for cooling at least the first power module and the second power module is provided.

12. The driving apparatus according to claim 11, wherein at least part of the first extension terminal is embedded in the first bus bar holder, and wherein at least part of the second extension terminal is embedded in the second bus bar holder.

13. The driving apparatus according to claim 12, wherein the respective bending portions of the power-source bus bar and the grounding bus bar are bent toward an anti-heat-sink side.

14. The driving apparatus according to claim 12, wherein the respective bending portions of the first power-source bus bar and the first grounding bus bar are arranged between the first power module and the first control board, and wherein the respective bending portions of the second power-source bus bar and the second grounding bus bar are arranged between the second power module and the second control board.

15. The driving apparatus according to claim 12, wherein each of the first extension terminal and the second extension terminal has a bending portion, wherein said bending portion is disposed in such a way as to face the respective bending portions of the first power-source bus bar and the first grounding bus bar, and wherein said bending portion is disposed in such a way as to face the respective bending portions of the second power-source bus bar and the second grounding bus bar.

16. The driving apparatus according to claim 11, wherein the respective bending portions of the power-source bus bar and the grounding bus bar are bent toward an anti-heat-sink side.

17. The driving apparatus according to claim 11, wherein the respective bending portions of the first power-source bus bar and the first grounding bus bar are arranged between the first power module and the first control board, and wherein the respective bending portions of the second power-source bus bar and the second grounding bus bar are arranged between the second power module and the second control board.

18. The driving apparatus according to claim 11, wherein the width of the bending portion in the first power-source bus bar is set to be larger than the width of the terminal portion in the first power-source bus bar, wherein the width of the bending portion in the first grounding bus bar is set to be larger than the width of the terminal portion in the first grounding bus bar, wherein the width of the bending portion in the second power-source bus bar is set to be larger than the width of the terminal portion in the second power-source bus bar, and wherein the width of the bending portion in the second grounding bus bar is set to be larger than the width of the terminal portion in the second grounding bus bar.

19. The driving apparatus according to claim 11, wherein each of the first extension terminal and the second extension terminal has a bending portion, wherein said bending portion is disposed in such a way as to face the respective bending portions of the first power-source bus bar and the first grounding bus bar, and wherein said bending portion is disposed in such a way as to face the respective bending portions of the second power-source bus bar and the second grounding bus bar.

20. An electric power steering apparatus comprising the driving apparatus according to claim 11, wherein assist torque corresponding to steering torque exerted on a steering shaft by a vehicle driver is generated by the driving apparatus, and wherein the generated assist torque is exerted on the steering shaft.

* * * * *